US010534761B2

(12) United States Patent
Dupey et al.

(10) Patent No.: US 10,534,761 B2
(45) Date of Patent: Jan. 14, 2020

(54) SIGNIFICANT CLEANSE CHANGE INFORMATION

(71) Applicant: SAP SE, Walldorf (DE)

(72) Inventors: Ronald Dupey, West Salem, WI (US); Jeffrey Woody, Onalaska, WI (US); Prasanthi Thatavarthy, Onalaska, WI (US)

(73) Assignee: SAP SE, Walldorf (DE)

( * ) Notice: Subject to any disclaimer, the term of this patent is extended or adjusted under 35 U.S.C. 154(b) by 631 days.

(21) Appl. No.: 14/972,708

(22) Filed: Dec. 17, 2015

(65) Prior Publication Data
US 2017/0177626 A1 Jun. 22, 2017

(51) Int. Cl.
G06F 16/215 (2019.01)
(52) U.S. Cl.
CPC .................. G06F 16/215 (2019.01)
(58) Field of Classification Search
CPC .............. G06F 17/30303; G06F 3/01
See application file for complete search history.

(56) References Cited

U.S. PATENT DOCUMENTS

| 2004/0225543 A1* | 11/2004 | Kapochunas | G06F 17/30306 705/7.37 |
| 2006/0256727 A1* | 11/2006 | Acharya | H04J 3/085 370/244 |
| 2007/0203939 A1* | 8/2007 | McArdle | G06F 17/30303 |
| 2013/0031044 A1* | 1/2013 | Miranda | G06N 5/025 706/47 |

* cited by examiner

Primary Examiner — Taelor Kim
(74) Attorney, Agent, or Firm — Buckley, Maschoff & Talwalkar, LLC

(57) ABSTRACT

A system includes reception of a first data record, identification of one or more component elements in the first data record, application of a cleansing operation to change a first component element of the one or more component elements to a first cleansed component element, the first cleansed component element being different from the first component element, automatic determination a change significance of the change, and storage an identifier of the first cleansed component element in association with an identifier of the change significance.

15 Claims, 20 Drawing Sheets

| Category | Example | Significance | Reason |
|---|---|---|---|
| Case | UNITED STATES → United States | Low | Ref, Fmt |
| Character width | Ｕ Ｓ → US | Low | Std |
| Spaces | UnitedStates → United States | Low | Ref, Std |
| Punctuation | U.S. → US | Low | Ref, Std |
| Add * | <null> → US | Low | Fmt |
| Standardization | Rep → Republic<br>Congo, Democratic Republic → Congo, The Democratic Republic of the<br>Republic of Korea → Korea, Republic of<br>United States of America → United States<br>Unnited States → United States<br>Russia → Russian Federation<br>South Korea → Korea, Republic of<br>UK → GB<br>US → United States<br>USA → US<br>276 → DE | Low | Ref |
| Diacritics | Mexico → México | Low | Ref, Fmt |
| Language | Brazil → Brasil | Low | Ref |
| Script | 中国 → CN | Medium | Ref |
| Change | United States → Puerto Rico<br>GB → IE<br>JA → JP<br>XX → US | High | Ref |
| Add ** | <null> → US | High | Ref |
| Delete | US → <null> | High | Conf |

*FIG. 3*

| Category | Example | Significance | Reason |
|---|---|---|---|
| Case | m9w 1p6 → M9W 1P6 | Low | Std |
| Character width | ５ ４ ６ ０ １ → 54601 | Low | Std |
| Spaces | 54601 - 5341 → 54601-5341<br>M9W1P6 → M9W 1P6 | Low | Ref, Std |
| Punctuation | 54601 5341 → 54601-5341 | Low | Ref, Std |
| Add (postcode description) | 110-8588 → 110-8588〒 | Low | Std |
| Delete (postcode description) | 110-8588〒 → 110-8588 | Low | Std |
| Add (postcode prefix) | 10587 → D10587 | Low | Ref |
| Delete (postcode prefix) | D10587 → 10587 | Low | Ref |
| Add (postcode2) * | 54601 → 54601-5341 | Low | Ref |
| Delete (postcode2) * | 54601-5341 → 54601 | Low | Conf |
| Change (postcode2) * | 54601-5341 → 54601-5340 | Low | Ref |
| Change (postcode prefix) | F10587 → D10587 | Medium | Ref |
| Add (postcode2) ** | M9W → M9W 1P6 | High | Ref |
| Delete (postcode2) ** | M9W 1P6 → M9W | High | Conf |
| Change (postcode2) ** | M9W 1P7 → M9W 1P6 | High | Ref |
| Change (postcode1) | 54601 → 54603<br>8057 → 08057 | High | Ref |
| Add (postcode1) | <null> → 54601 | High | Ref |
| Delete (postcode1) | 54601 → <null> | High | Conf |

FIG. 4

| Category | Example | Significance | Reason |
|---|---|---|---|
| Case | Île-De-France → Île-de-France | Low | Ref, Fmt |
| Character width | Ｃ Ａ → CA | Low | Std |
| Spaces | SouthCarolina → South Carolina | Low | Ref, Std |
| Punctuation | Île de France → Île-de-France | Low | Ref, Std |
| Diacritics | Ile-de-France → Île-de-France | Low | Ref, Fmt |
| Standardization | California → CA<br>S. Carolina → South Carolina<br>Calif. → California | Low | Ref, Fmt |
| Add (region/subregion description) | 上海 → 上海市 | Low | Ref, Std |
| Delete (region/subregion description) | Washington State → Washington<br>Orange County → Orange | Low | Ref, Std |
| Add (region/subregion name) * | <null> → Baden-Württemberg | Low | Ref |
| Delete (region/subregion name) * | Baden-Württemberg → <null> | Medium | Conf |
| Change (region/subregion name) * | Bayern → Baden-Württemberg | Medium | Ref |
| Language | Terre-Neuve → Newfoundland | Medium | Ref |
| Change (region/subregion name) ** | North Carolina → South Carolina<br>Massachusets → Massachusetts<br>Carolina → South Carolina<br>XX → SC | High | Ref |
| Add (region/subregion name) ** | <null> → SC | High | Ref |
| Delete (region/subregion name) ** | SC → <null> | High | Conf |

*FIG. 5*

| Category | Example | Significance | Reason |
|---|---|---|---|
| Case | Rio De Janeiro → Rio de Janeiro | Low | Ref, Fmt |
| Character width | Ｃｈｉｃａｇｏ → Chicago | Low | Std |
| Spaces | Lacrosse → La Crosse<br>Williams Town → Williamstown | Low | Ref, Std |
| Punctuation | Bietigheim Bissingen → Bietigheim-Bissingen<br>Ft. Worth → Ft Worth | Low | Ref, Std |
| Diacritics | Sao Paulo → São Paulo | Low | Ref, Fmt |
| Standardization | Ciudad → Cd.<br>Fort → Ft<br>N → North<br>NYC → New York<br>W Harrisburg → West Harrisburg | Low | Ref |
| Add (city/subcity description) | 上海→上海市 | Low | Ref |
| Delete (city/subcity description) | New York City → New York | Low | Ref |
| Add (subcity* name) | <null> → Aachen | Low | Ref |
| Delete (subcity* name) | Aachen → <null> | Medium | Conf |
| Change (subcity* name) | Achen → Aachen | Medium | Ref |
| Language | Brussels → Bruxelles<br>Mexico City → Ciudad de México | Medium | Ref |
| Add (city/subcity qualifier) | Frankfurt → Frankfurt am Main | Medium | Ref |
| Delete (city/subcity qualifier) | Paris CEDEX 8 → Paris | Medium | Ref |
| Alternate | Hollywood → Los Angeles | Medium | Ref |
| Change (city/subcity description) | 目黒市→目黒区 | High | Ref |
| Change (city/subcity qualifier) | Paris CEDEX 8 → Paris CEDEX 9 | High | Ref |
| Change (city/subcity** name) | Windy City → Chicago<br>Unknown → Chicago<br>Mineapolis → Minneapolis<br>Minneapolis → St. Paul | High | Ref |
| Add (city/subcity** name) | <null> → Chicago | High | Ref |
| Delete (city/subcity** name) | Chicago → <null> | High | Conf |

*FIG. 6*

| Category | Example | Significance | Reason |
|---|---|---|---|
| Case | Rue De La Reunion → rue de la Reunion | Low | Ref, Fmt |
| Character width | Ｍａｉｎ　Ｓｔ → Main St | Low | Std |
| Spaces | 4 th → 4th | Low | Ref, Std |
| Punctuation (street type, street prefix, street postfix) | Ave. → Ave<br>N → N. | Low | Fmt, Std |
| Punctuation (street name) * | P.O. Box → PO Box<br>R.R. → RR<br>G.D. → GD | Low | Ref, Fmt, Std |
| Add (street type) *** | 6-1-19 → 6丁目1番19号<br>Juarez → Calle Juarez | Low | Ref |
| Delete (street type) *** | 6丁目1番19号 → 6-1-19 | Low | Std |
| Standardization | Doctor → Dr.<br>Third → 3rd<br>Street → St.<br>N → North | Low | Ref |
| Change (street name) * | Postal Box → PO Box<br>Rural Route → RR<br>General Delivery → GD | Low | Ref, Fmt |
| Diacritics | Schoenfliesser → Schönfließer | Low | Ref, Fmt |
| Punctuation (street name) ** | Heinrich Heine Str → Heinrich-Heine-Str<br>de L Evangile → de l'Evangile | Low | Ref, Std |
| Attach/Detach (street name with street type) | Edison Str → Edisonstr<br>Brünerstr → Brüner Str | Low | Ref |
| Language | 's-Herenhuislaan 1 → avenue 's Heeren Huys 1<br>PO Box → Caixa Postale | Medium | Ref |
| Alternate | Martin Luther King Jr Blvd → State Road 35<br>6th Ave → Avenue of The Americas<br>(This also occurs when there is an alternate entrance and the whole street, street number, and secondary components are changed) | Medium | Ref |
| Add (street type) **** | Main → Main St<br>Juarez → Avenida Juarez | High | Ref |
| Delete (street type) **** | Main St → Main | High | Ref |
| Change (street type, street prefix, street postfix) | Main St → Main Rd<br>Main St N → Main St S<br>2丁目 → 2番 | High | Ref |
| Add (street prefix, street postfix) | Main St → Main St N | High | Ref |
| Delete (street prefix, street postfix) | Main St N → Main St | High | Ref, Conf |
| Change (street name) ** | Lakshore Dr → Lakeshore Dr | High | Ref |

*FIG. 7*

| Category | Example | Significance | Reason |
|---|---|---|---|
| Case | 7b → 7B | Low | Ref, Fmt |
| Character width | １ ０ ０ → 100 | Low | Std |
| Spaces | 7 - 9 → 7-9<br>7 B → 7B | Low | Ref, Std |
| Punctuation | SN → S/N<br>Km. → Km<br>2,5 → 2.5 | Low | Ref, Std |
| Diacritics | Numero → Número | Low | Ref, Fmt |
| Standardization | Number → Num → No → N°<br>Kilometer → Km<br># → <null><br># → Unit<br>Third → 3rd → 3$^{rd}$ → III → 3 | Low | Ref |
| Add (street number description) | 9→ 9号<br>20 → Box 20 | Low | Ref |
| Alternate | (Occurs when there is an alternate entrance and the whole street, street number, and secondary components are changed) | Medium | Ref |
| Delete (street number description) | 9号→ 9 | Low | Std |
| Change (street number) | 10 → 77 | High | Ref |
| Add (street number) | <null> → 100 | High | Ref |
| Delete (street number) | 100 → <null> | High | Conf |

*FIG. 8*

| Category | Example | Significance | Reason |
|---|---|---|---|
| Case | Macarthur → MacArthur<br>De → de<br>Cpa → CPA | Low | Ref, Fmt |
| Character width | Ｊｏｈｎ → John | Low | Std |
| Spaces | O' Connor → O'Connor<br>Karl - Heinz → Karl-Heinz | Low | Ref, Std |
| Punctuation * (maturity postname, honorary postname, prename, name designator) | Mr → Mr.<br>MD → M.D.<br>(Jr.) → Jr.<br>"Jr." → Jr.<br>Mr.-Dr. → Mr. Dr. | Low | Ref, Std |
| Punctuation ** (first name, middle name, last name, last name 2) | M → M.<br>Th → Th.<br>(John) → John | Low | Std |
| Change (maturity postname, honorary postname, prename, name designator) | Doctor → Dr.<br>Junior → Jr.<br>Sñrta. → Srta. | Low | Ref |
| Add (prename) | <null> → Mr. | Low | Der |
| Change order (first name, middle name, last name, last name 2) | Miller John → John Miller | Medium | Ref |
| Change order (maturity postname, honorary postname, prename, name designator) | John Miller Mr. → Mr. John Miller<br>Karl Schmidt I → I Karl Schmidt | Medium | Ref |
| Punctuation *** (first name, middle name, last name, last name 2) | Karl Heinz → Karl-Heinz | Medium | Ref |
| Punctuation **** (first name, middle name, last name, last name 2) | OConnor → O'Connor<br>Prudhomme → Prud'Homme<br>D Oliveira → D'Oliveira | Medium | Ref |
| Diacritics | Hernandez → Hernández | Medium | Ref, Fmt |
| Change (first name, middle name, last name, last name 2) | Sanches → Sanchez | High | Ref |
| Delete (maturity postname, honorary postname, prename, name designator) | John Miller M.D. → John Miller<br>Mr. Dr. → Mr. | High | Conf |
| Delete (first name, middle name, last name, last name 2) | John Miller Anderson → John Miller | High | Conf |

*FIG. 9*

| Category | Example | Significance | Reason |
|---|---|---|---|
| Case | Cto → CTO<br>Director Of Technology → Director of Technology | Low | Ref, Fmt |
| Character width | C E O → CEO | Low | Std |
| Spaces | Vice - President → Vice-President | Low | Ref, Std |
| Punctuation | Sr → Sr.<br>C.E.O. → CEO<br>Vicepresident → Vice-President<br>DInformation → D'Information<br>(Jr.) → Jr.<br>"Senior" → Senior | Low | Ref, Std |
| Diacritics | Qualite → Qualité | Low | Ref, Fmt |
| Standardization | Senior → Sr.<br>Asociate → Associate<br>Vice Pres. → Vice President | Medium | Ref |
| Change | Chief Financial Officer → CFO<br>VP → Vice President | High | Ref |
| Delete | CEO → <null> | High | Conf |

*FIG. 10*

| Category | Example | Significance | Reason |
|---|---|---|---|
| Case | GMBH → GmbH<br>Univ. Of Colorado → Univ. of Colorado<br>MCDONALDS → McDonalds | Low | Ref, Fmt |
| Character width | S A P → SAP | Low | Std |
| Spaces | GmbH&Co.KG → GmbH & Co. KG<br>(株) 福原 → (株)福原 | Low | Ref, Std |
| Punctuation | Inc → Inc.<br>S/A → S.A.<br>e.K. → eK<br>(Group) → Group | Low | Ref, Std |
| Standardization (firm type) | Corporation → Corp. | Low | Ref |
| Diacritics | Participacoes → Participações | Low | Ref, Fmt |
| Standardization (firm name) | University → Univ.<br>Independant → Independent | Medium | Ref |
| Change | BOA → Bank of America<br>Department of Natural Resources → DNR | High | Ref |
| Delete | SAP → <null> | High | Conf |

*FIG. 11*

| Category | Example | Significance | Reason |
|---|---|---|---|
| Case | EXT → Ext | Low | Ref |
| Character width | ６０８－７８２－５４１６ → 608-782-5416 | Low | Std |
| Spaces | Ext2665 → Ext 2665 | Low | Std |
| Diacritics | Extension → Extensión | Low | Ref |
| Punctuation | 608.782.5416 → 608-782-5416<br>6087825416 → (608) 782-5416<br>Ext. → Ext | Low | Fmt |
| Standardization | Extension → Ext<br>x → Ext | Low | Std |
| Add (country code) | 0228 941920 → 49 0228 941920 | High | Der |
| Delete (phone number) | 310-PET-SHOP → <null> | High | Ref |

*FIG. 12*

Data Preparation

Worksheet_123 — 1400

Rows: 103,351 | search

| SALUTATION | FNAME | LNAME | STREET1 | LOCALITY1 | > Properties |
|---|---|---|---|---|---|
| ~~~~~~ | ~~~~~~ | ~~~~~~ | ~~~~~~ | ~~~~~~ | v Actions |
| ~~~~~~ | ~~~~~~ | ~~~~~~ | ~~~~~~ | ~~~~~~ | Show/Hide Columns |
| ~~~~~~ | ~~~~~~ | ~~~~~~ | ~~~~~~ | ~~~~~~ | Add Formula Column |
| ~~~~~~ | ~~~~~~ | ~~~~~~ | ~~~~~~ | ~~~~~~ | Cleanse Worksheet |
| ~~~~~~ | ~~~~~~ | ~~~~~~ | ~~~~~~ | ~~~~~~ | Remove Duplicates |
| ~~~~~~ | ~~~~~~ | ~~~~~~ | ~~~~~~ | ~~~~~~ | |
| ~~~~~~ | ~~~~~~ | ~~~~~~ | ~~~~~~ | ~~~~~~ | |
| ~~~~~~ | ~~~~~~ | ~~~~~~ | ~~~~~~ | ~~~~~~ | |
| ~~~~~~ | ~~~~~~ | ~~~~~~ | ~~~~~~ | ~~~~~~ | |
| ~~~~~~ | ~~~~~~ | ~~~~~~ | ~~~~~~ | ~~~~~~ | |
| ~~~~~~ | ~~~~~~ | ~~~~~~ | ~~~~~~ | ~~~~~~ | |
| ~~~~~~ | ~~~~~~ | ~~~~~~ | ~~~~~~ | ~~~~~~ | |

| Data Preparation | | | | | | | | | | | | | |
|---|---|---|---|---|---|---|---|---|---|---|---|---|---|
| ▼ | Address | et_123 | 03,351 | search | | | | | | | | > *Properties* | |
| | *Define Filter* | | TREET1 | LOCALITY1 | | | | | | | | v *Actions* | |
| | ☑ City Name | | ~~~~ | ~~~~ | ~~~~ | ~~~~ | ~~~~ | ~~~~ | ~~~~ | ~~~~ | ~~~~ | Show/Hide Columns | |
| | ☑ City Code | | ~~~~ | ~~~~ | ~~~~ | ~~~~ | ~~~~ | ~~~~ | ~~~~ | ~~~~ | ~~~~ | Add Formula Column | |
| | ☐ City Addition | | ~~~~ | ~~~~ | ~~~~ | ~~~~ | ~~~~ | ~~~~ | ~~~~ | ~~~~ | ~~~~ | Cleanse Worksheet | |
| | APPLY | | ~~~~ | ~~~~ | ~~~~ | ~~~~ | ~~~~ | ~~~~ | ~~~~ | ~~~~ | ~~~~ | Remove Duplicates | |
| | ~~~~ | ~~~~ | ~~~~ | ~~~~ | ~~~~ | ~~~~ | ~~~~ | ~~~~ | ~~~~ | ~~~~ | ~~~~ | | |
| | ~~~~ | ~~~~ | ~~~~ | ~~~~ | ~~~~ | ~~~~ | ~~~~ | ~~~~ | ~~~~ | ~~~~ | ~~~~ | | |
| | ~~~~ | ~~~~ | ~~~~ | ~~~~ | ~~~~ | ~~~~ | ~~~~ | ~~~~ | ~~~~ | ~~~~ | ~~~~ | | |
| | ~~~~ | ~~~~ | ~~~~ | ~~~~ | ~~~~ | ~~~~ | ~~~~ | ~~~~ | ~~~~ | ~~~~ | ~~~~ | | |

1800

| Data Preparation | | | | | | |
|---|---|---|---|---|---|---|
| | Worksheet_123 | | | | | |
| ▼ | Address: *Significant Chan...* | | Rows: 252 (103,531) | search | | > *Properties* |
| | SALUTATION | FNAME | LNAME | STREET1 | LOCALITY1 | v *Actions* |
| | ~~~~ | ~~~~ | ~~~~ | ~~~~ | ~~~~ | Show/Hide Columns |
| | ~~~~ | ~~~~ | ~~~~ | ~~~~ | ~~~~ | Add Formula Column |
| | ~~~~ | ~~~~ | ~~~~ | ~~~~ | ~~~~ | Cleanse Worksheet |
| | ~~~~ | ~~~~ | ~~~~ | ~~~~ | ~~~~ | Remove Duplicates |
| | ~~~~ | ~~~~ | ~~~~ | ~~~~ | ~~~~ | |
| | ~~~~ | ~~~~ | ~~~~ | ~~~~ | ~~~~ | |
| | ~~~~ | ~~~~ | ~~~~ | ~~~~ | ~~~~ | |
| | ~~~~ | ~~~~ | ~~~~ | ~~~~ | ~~~~ | |
| | ~~~~ | ~~~~ | ~~~~ | ~~~~ | ~~~~ | |
| | ~~~~ | ~~~~ | ~~~~ | ~~~~ | ~~~~ | |
| | ~~~~ | ~~~~ | ~~~~ | ~~~~ | ~~~~ | |
| | | | | | | |

SIGNIFICANT CLEANSE CHANGE INFORMATION

BACKGROUND

Enterprise database systems store vast amounts of data received from one or more different sources. The received data may be subjected to various types of processing in order to standardize, verify and/or complete the data. This processing inevitably leads to changes in the data.

Incoming data may be merged with master data after being subjected to such processing. However, it is desirable to review the processed data prior to merging in order to preserve the integrity of the master data. This review may be unsuitably resource-intensive, particularly in the case of enterprise data consisting of millions of rows of data and including multiple dimensions from different countries, different languages, different data sources, etc.

BRIEF DESCRIPTION OF THE DRAWINGS

FIG. 3 illustrates examples of associated change categories, change significances and change reasons for a Country component according to some embodiments.

FIG. 4 illustrates examples of associated change categories, change significances and change reasons for a Postcode component according to some embodiments.

FIG. 5 illustrates examples of associated change categories, change significances and change reasons for a Region component according to some embodiments.

FIG. 6 illustrates examples of associated change categories, change significances and change reasons for a City component according to some embodiments.

FIG. 7 illustrates examples of associated change categories, change significances and change reasons for a Street component according to some embodiments.

FIG. 8 illustrates examples of associated change categories, change significances and change reasons for a Street Number component according to some embodiments.

FIG. 9 illustrates examples of associated change categories, change significances and change reasons for a Person component according to some embodiments.

FIG. 10 illustrates examples of associated change categories, change significances and change reasons for a Title component according to some embodiments.

FIG. 11 illustrates examples of associated change categories, change significances and change reasons for a Firm component according to some embodiments.

FIG. 12 illustrates examples of associated change categories, change significances and change reasons for a Phone component according to some embodiments.

FIG. 14 is an outward view of a user interface of a Data Preparation application according to some embodiments.

FIG. 17 is an outward view of a user interface of a Data Preparation application according to some embodiments.

FIG. 18 is an outward view of a user interface of a Data Preparation application according to some embodiments.

FIG. 19 is an outward view of a user interface of a Data Preparation application according to some embodiments.

DETAILED DESCRIPTION

The following description is provided to enable any person in the art to make and use the described embodiments. Various modifications, however, will remain readily apparent to those in the art.

Some embodiments facilitate the characterization of changes to data, and the presentation of such changes to users according to different degrees of granularity based on the characterizations. According to some embodiments, information characterizing the changes may be stored in a manner which allows an application to efficiently retrieve and display to the user only those changes which have been characterized as significant.

Figure 1:
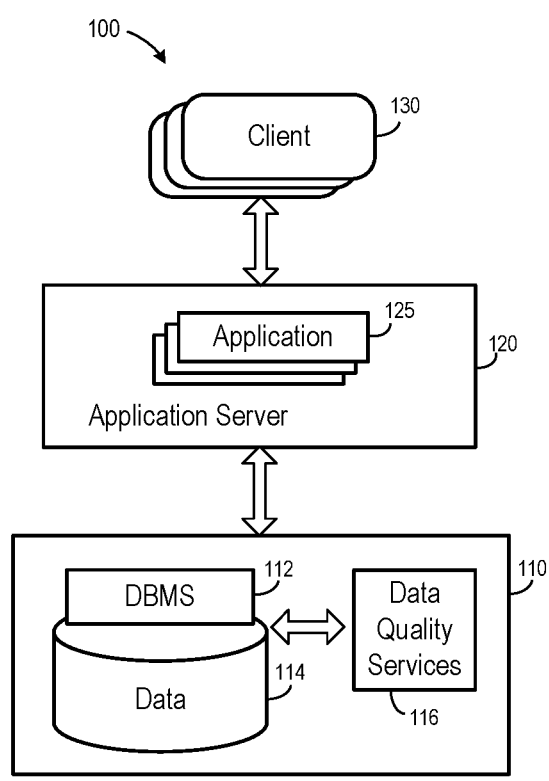
FIG. 1 is a block diagram of a database architecture according to some embodiments.

FIG. 1 is a block diagram of database architecture 100 according to some embodiments. Embodiments are not limited to architecture 100 or to a database architecture. Architecture 100 includes database 110, application server 120 and clients 130.

Application server 120 executes and provides services to applications 125. Applications 125 may comprise server-side executable program code (e.g., compiled code, scripts, etc.) which provide functionality to clients 130 by providing user interfaces to clients 130, receiving requests from clients 130 via such user interfaces, retrieving data from database 110 based on the requests, processing the data received from database 110, and providing the processed data to clients 130. Applications 125 executing within application server 120 may also expose administrative functions to clients 130, including but not limited to data quality services as will be described below. Applications 125 may be made available for execution by application server 120 via registration and/or other procedures which are known in the art.

Application server 120 provides any suitable interfaces through which clients 130 may communicate with applications 125 executing on application server 120. For example, application server 120 may include a HyperText Transfer Protocol (HTTP) interface supporting a transient request/response protocol over Transmission Control Protocol (TCP), a WebSocket interface supporting non-transient full-duplex communications between application server 120 and any clients 130 which implement the WebSocket protocol over a single TCP connection, and/or an Open Data Protocol (OData) interface.

Database 110 comprises database management system (DBMS) 112, data 114 and data quality services 116. One or more applications 125 executing on server 120 may communicate with DBMS 112 using database management interfaces such as, but not limited to, Open Database Connectivity (ODBC) and Java Database Connectivity (JDBC) interfaces. These types of applications 125 may use Structured Query Language (SQL) to manage, modify and query data stored in database 110.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. Data 114 may be distributed among several relational databases, dimensional databases, and/or other data sources. Embodiments are not limited to any number or types of data sources.

DBMS 112 serves requests to retrieve and/or modify data 114, and also performs administrative and management functions. Such functions may include snapshot and backup management, indexing, optimization, garbage collection, and/or any other database functions that are or become known. Database 110 may also provide application logic, such as database procedures and/or calculations, according to some embodiments. This application logic may comprise scripts, functional libraries and/or compiled program code.

In some embodiments, data 114 may comprise one or more of conventional tabular data, row-based data, column-based data, and object-based data. Data 114 may be indexed and/or selectively replicated in an index to allow fast searching and retrieval thereof. Database 110 may support multi-tenancy to separately support multiple unrelated clients by providing multiple logical database systems which are programmatically isolated from one another.

Data 114 may also store metadata regarding the structure, relationships and meaning of the data stored within data 114. This information may include data defining the schema of database tables stored within data 114. A database table schema may specify the name of the database table, columns of the database table, the data type associated with each column, and other information associated with the database table.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data quality services 116 may comprise functions to selectively process data of data 114. These functions may include, but are not limited to, data cleansing, data matching, best record identification, semantic profiling and data enrichment functions. These functions may be exposed to applications 125 via the OData protocol, and thereby available to clients 130 for direct initiation or as underlying processes of an algorithm executed by an application 125.

Data 114 may therefore include "raw" data and processed data. For example, data 114 may include address records including data received from one or more sources, and "cleansed" address records which are output from a cleansing operation. A cleansing operation may include one or more chained transforms. Generally, a transform generates a set of output records from a set of input records. The input records and the output records may or may not exhibit different schemas.

Application server 120 may be separated from or closely integrated with database 110. A closely-integrated application server 120 may enable execution of server applications 125 completely on database 110, without the need for an additional application server. For example, according to some embodiments, database 110 includes a comprehensive set of embedded services which provide end-to-end support for Web-based applications. The services may include a lightweight web server, configurable support for OData, server-side JavaScript execution and access to SQL and SQLScript.

Each of clients 130 may comprise one or more devices executing program code of a software application for presenting user interfaces to allow interaction with application server 120. The user interfaces may comprise user interfaces suited for reporting, data analysis, and/or any other functions based on data 114.

Presentation of a user interface as described herein may comprise any degree or type of rendering, depending on the type of user interface code generated by application server 120. For example, a client 130 may execute a Web Browser to request and receive a Web page (e.g., in HTML format) from application server 120 via HTTP, HTTPS, and/or WebSocket, and may render and present the Web page according to known protocols. One or more of clients 130 may also or alternatively present user interfaces by executing a standalone executable file (e.g., an .exe file) or code (e.g., a JAVA applet) within a virtual machine.

Figure 2:
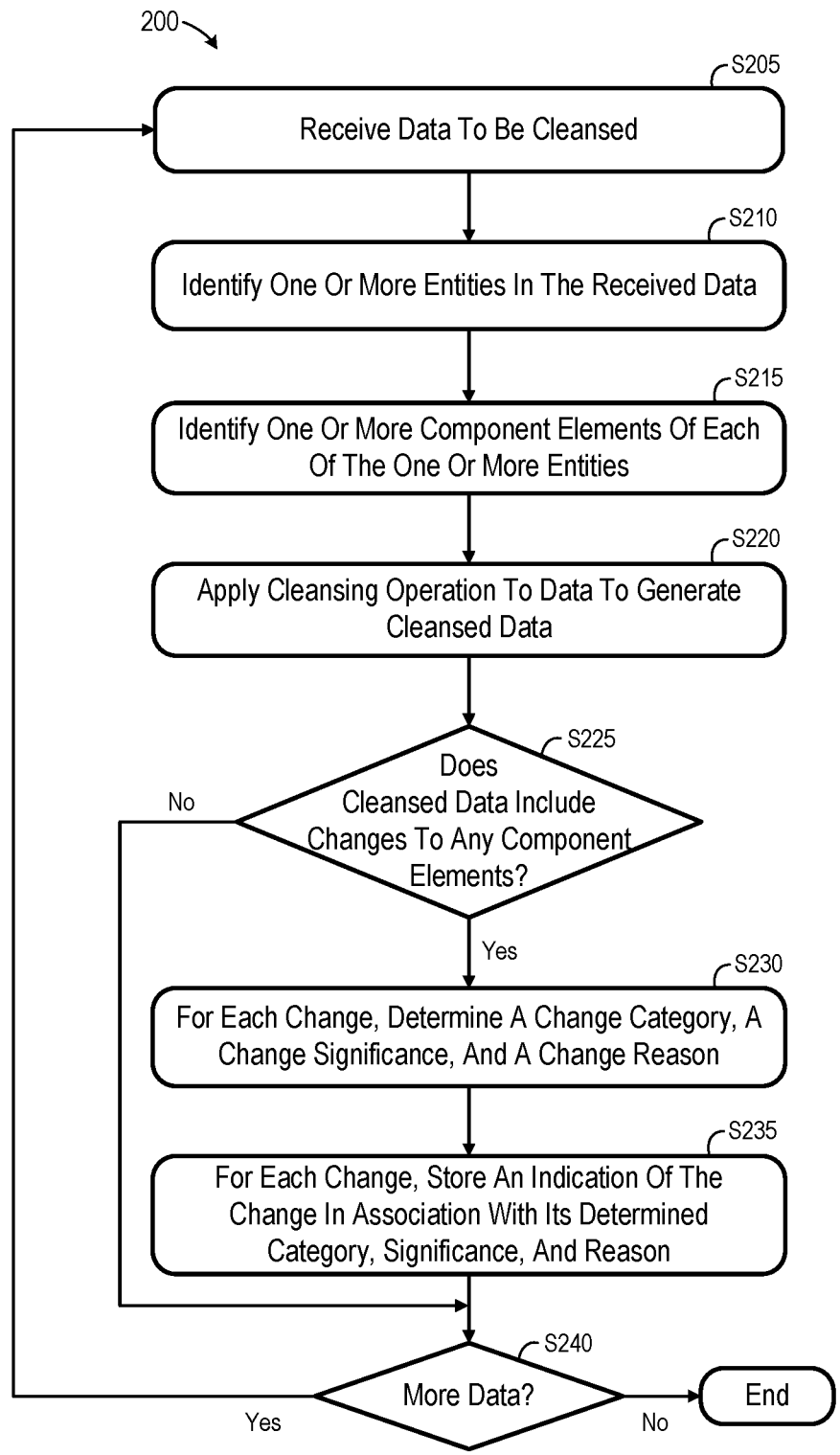
FIG. 2 comprises a flow diagram of a process according to some embodiments.

FIG. 2 comprises a flow diagram of process 200 according to some embodiments. Process 200 may comprise an cleansing operation according to some embodiments. In some embodiments, various hardware elements of architecture 100 (e.g., one or more processors) execute program code to perform process 200. The program code may be implemented within data quality services 116 according to some embodiments.

Process 200 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 may be executed in response to a command received from a user. For example, a client device 130 may access a data preparation application 125 and may present user interfaces thereof. A user may manipulate the user interfaces in order to select a set of records (e.g., all records) of a database table of data 114, and one or more transforms to apply to the set of records. Non-exhaustive examples of transforms include data validation and data standardization.

Regardless of how process 200 is initiated, data to be cleansed is received at S205. The data may be received from any source and may include any one or more values. For purposes of the present description, it will be assumed that the received data comprises a record conforming to a schema of a database table, but embodiments are not limited thereto. In this regard, the data received at S205 may be one record among a set of many records to be cleansed.

One or more entities are identified in the received data at S210. An entity is a logical construct which may be defined by components, each of which may consist of one or more constituent component elements. The cleansed data may conform to a predefined schema consisting of component elements.

According to some embodiments, Address is an entity with components such as Country, Postcode, Region, City, Street, Street Number, Floor, Unit, etc. Embodiments are not limited to these above components. In one example, the component City may be defined by the component elements City Name, City Description, City Qualifier, City Code and City Addition. The entity Person, on the other hand, may include the single component Person. Component elements of the component Person may include First Name, Middle Name, Last Name, Prename, and Name Designator. Other examples of entities may include Title, Firm, Phone and Email.

Accordingly, at S210, the received data is analyzed to identify entities therein. For example, in a case that the received data includes a first name, a last name, a city, a state and an email address, the entities Person, Address and Email may be identified at S210. Systems for identifying entities from received data are known in the art.

Next, for each of the one or more entities, one or more components elements are identified at S215. Such identification is also known in the art. Continuing the above example, the component elements First Name and Last Name of the entity Person may be identified, the component elements City Name and Region Name of the entity Address may be identified, and the component element Email address of the entity Email may be identified.

A cleansing operation is applied to the received data to generate cleansed data at S220. Any operations for processing data may be employed at S220. S220 may consist of several "pipelined" operations in which the output of one operation becomes the input of a next operation. The data associated with one entity may be subjected to different operations than the data associated with another entity. S220 may result in changing some of the received data, adding to the received data, and/or deleting some of the received data. According to some embodiments, the generated cleansed data conforms to a predefined schema which is different from the original schema of the received data. The predefined schema may include component elements of entities as described above.

At S225, it is determined whether the cleansed data includes any changes to any of the data associated with the identified component elements. Such changes may include deleting the data or making any other change to the data. If no changes were made, flow continues to S240 to determine whether additional data remains to be cleansed. If so, flow returns to S205 to receive additional data to be cleansed.

Flow continues from S225 to S230 if it is determined at S225 that the cleansed data includes changes to one or more component elements. At S230, a change category, a change significance and a change reason are determined for each change.

Some embodiments may determine one or more of the following fourteen change categories for each change at S230. Embodiments are not limited thereto.

Case (1)—Identifies a change to casing. A user may select a formatting setting of upper, lower, or mixed casing to be applied at S220. In a case that the user selects a casing different than the casing of the received data, this change may be determined for every data element of the received data.

Character width (2)—Identifies a change between full-width characters and half-width characters.

Spaces (3)—Identifies the addition or removal of spaces. These changes may be due to retrieving a corrected form of a component element from reference data, or due to general standardization when leading or trailing spaces are trimmed or when multiple sequential spaces are replaced with a single space.

Punctuation (4)—Identifies the addition, removal, or changing of punctuation. These changes may be due to retrieving a corrected from of a component element from reference data, or due to general standardization.

Standardization (5)—Identifies changing of the form of a component element to a standard form, or changing a word within a multiple-word component element to a standard form.

Diacritics (6)—Identifies a change between us-ascii characters and extended ascii characters. The change may be between a character with a diacritic and the same character without a diacritic, but in some cases the us-ascii form consists of two characters and the extended ascii form consists of one character without an actual diacritical character.

Language (7)—Identifies a change between a component element in one language and the same element in another language.

Script (8)—Identifies a change between a component element in one script and the same element in another script.

Alternate (9)—Identifies a change between official names and known aliases.

Attach/Detach (10)—Identifies a change between separating multiple component elements in the input and combining the multiple component elements in the output.

Change order (11)—Identifies a change to the location of a component element relative to other component elements.

Change (12)—Identifies a change to a component element due to retrieval from reference data. These include changes such as spelling corrections and complete changes to contents which are usually more significant than the changes encompassed by the above change categories.

Add (13)—Identifies the addition of a component element which does not exist in the input data.

Delete (14)—Identifies the removal of a component element which exists in the received data and not in the generated cleansed data.

A change significance of "significant" or "not significant" may be determined for each change in S230. In some embodiments, one of three significances is determined for each change: low significance, medium significance, and high significance. These significances may be defined as follows in some embodiments.

Low significance (3)—Changes involving formatting preferences and data standardization such as changes to casing, changes between abbreviated and expanded forms of words, inclusion or exclusion of punctuation, and most changes involving spaces.

Medium significance (2)—Minor changes to an important aspect of data that most users would consider a normal and expected part of the cleansing process and therefore decide that manual review of such a change is not necessary.

High significance (1)—Changes in which an important aspect of the data is changed, added, or deleted (with the exception of minor changes that are categorized as medium significance).

A particular change category may be consistently associated with a same level of significance for changes to all component elements. For example, all changes falling under the case category, regardless of the component element to which the change was made, may always be assigned a low significance. However, a particular change category may be associated with one significance in the case of one component element and associated with another significance in the case of another component element. For example, in some embodiments, a change adding or deleting diacritics is determined to be associated with a low significance for all address component elements but associated with a medium significance for some person component elements.

A change reason is determined for each change at S230. For example, in a case that the determined change category is Add (13), one of the following reasons may be determined at S230:

Reference data (1)—If an entity sufficiently matches reference data, then any component element in that entity that was missing from the input data may be extracted from the reference data and added to the output (i.e., cleansed) data. For example, an address may be input without a postcode. If the address matches a valid address in the reference data based on the city, region, and street information, the postcode for the address may be extracted from the reference data and added to the output address.

Derived (2)—Some component elements may be added to the input data during cleansing because they can be derived from attributes of other elements. For example, if a person name is input with the first name "John", it may be derived that the prename is "Mr." based on the gender attribute of the name John.

If the change category is Delete (14), the following reasons may be determined for the deletion of a component element from the input data:

Reference data (1)—If an entity matches reference data, then any extraneous input component element is deleted. For example, addresses in the United States do not officially include subcity data and therefore the cleansing process may delete subcity data from the input data.

Insufficient confidence (3)—If there is insufficient confidence in identifying an entity, the entire contents of the fields for the entity may be deleted. For example, if an address is input and the country of the address cannot be confidently identified, the address may be deleted.

Standardization (4)—Some elements may be removed due to data standardization inherent in the cleansing process. For example, a subregion description such as changing "Center District" may be truncated to "Center" in order to standardize the data.

For all other change categories, the following change reasons may be determined for various changes at S230:

Reference data (1)—If input data matches reference data then the cleanse operation may change the input data in order to conform to the form of the reference data. The change may be due to a correction of data such as correcting an incorrect spelling of a city name, a change to a standard form of data such as standardizing multiple variations of a company name (e.g., Hewlett Packard to HP), or a change to conform to rules such as changing the order of first name and last name in a person name.

Formatting (5)—Some element components may change form due to user preferences in the formatting settings. For example, if a setting for abbreviated regions is selected the input data "California" may change to "CA".

Standardization (4)—Some element components may change form due to general data standardization that is inherent in the cleansing process. For example, leading and trailing spaces may be removed, and multiple sequential spaces may be replaced with a single space.

According to some embodiments, more than one change reason may be determined for a change at S230. For example, the change "UNITEDSTATES" to "United States" reflects three of the above-described change reasons. Specifically, corresponding reference data (1) indicates that there should be a space between the two words, the user-sets formatting settings (6) require mixed case, and general data standardization (5) removes leading and trailing spaces. In such cases, an order of precedence may determine which of the three change reasons is determined for the change at S230. Of course, more than one change reason may be determined for a change at S230 according to some embodiments.

The order of precedence according to some embodiments is as follows:
1) Adds—Reference Data, Derived
2) Deletes—Reference data, Insufficient confidence, Standardization
3) All other changes—Reference data, Formatting, Standardization According to some embodiments, the change category, change significance and/or change reason assigned to a particular type of change may be hard-coded and/or user-editable. FIGS. 3-12 illustrate examples of change categories, change significances and change reasons for various types of changes to component elements of the various entities according to some embodiments. For example, FIG. 3 illustrates examples of changes to component elements of the Country component of the Address entity. Each example is shown in association with a change category, a change significance and change reason(s) which may be determined for the change in some embodiments.

FIGS. 4-8 show examples of changes, and associated change categories, change significances and change reasons, for component elements of the Postcode, Region, City, Street, and Street Number components of the Address entity, respectively. Similarly, FIGS. 9-12 show examples of changes and associated change categories, change significances and change reasons for component elements of the Person, Title, Firm, and Phone components, respectively.

Figure 13:
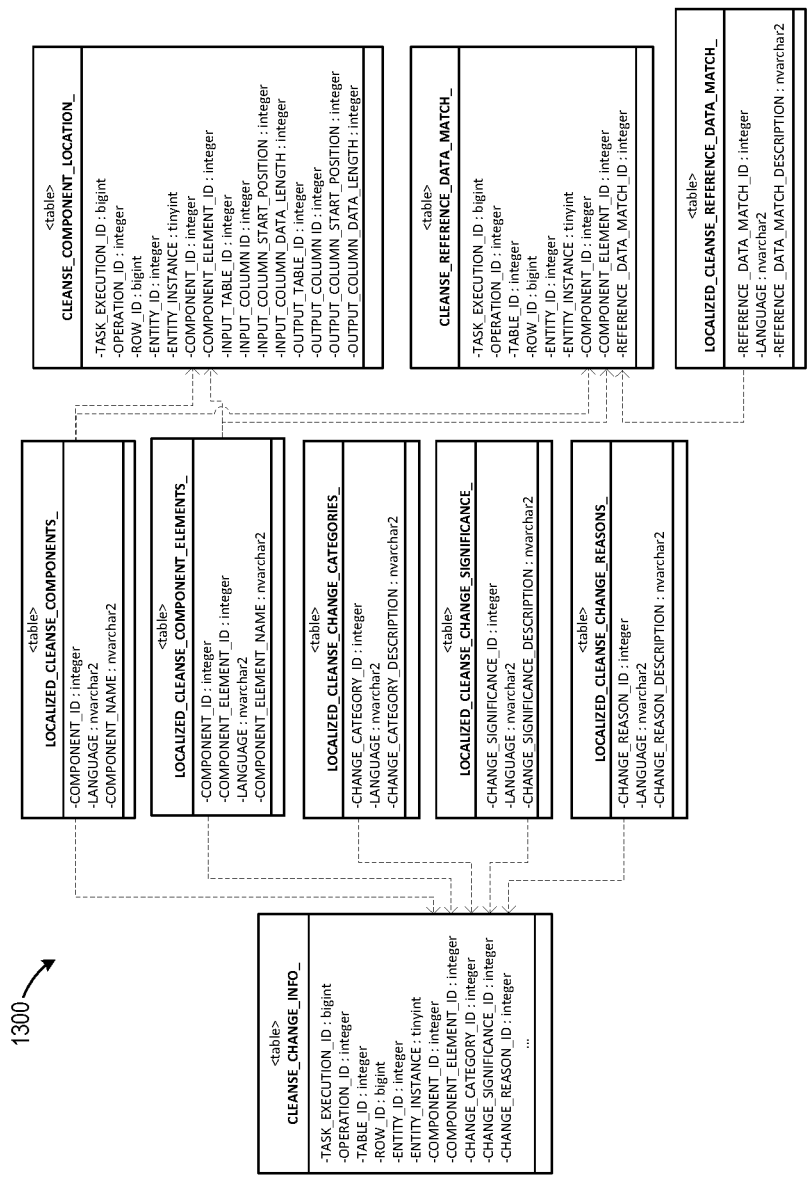
FIG. 13 illustrates a data schema according to some embodiments.

At S235, and for each change to the component elements of the input data, an indication of the change is stored in association with its determined change category, change significance and change reason. Any data structure or schema may be employed in some embodiments to implement the storage and associations of S235. FIG. 13 is a diagram of such a schema 1300 according to some embodiments.

With reference to schema 1300, and according to some embodiments, S235 comprises writing change information to a CLEANSE_CHANGE_INFO_table. This table is associated with five supporting static tables to support localization. Schema 1300 also includes a CLEANSE_REFERENCE_DATA_MATCH_table with supporting static LOCALIZED_CLEANSE_REFERENCE_DATA_MATCH_table, and a CLEANSE_COMPONENT_LOCATION_table.

According to some embodiments, the elements of each table are defined as follows:

TASK_EXECUTION_ID (PK)—A unique ID to describe a run of a task.

OPERATION_ID (PK)—An internal ID to differentiate all operations within a given task. The combination of OPERATION_ID and TASK_EXECUTION_ID gives the full unique key.

TABLE_ID (PK)—An internal ID (e.g., generated by the cleansing transforms themselves) which describes an input table to the operation. This ID remains unique within a particular OPERATION_ID.

ROW_ID (PK)—An internal sequence number based on the internal row number of the input table (itab). This value may be passed to the cleansing transform.

ENTITY_ID (PK)—An identification number that refers to entities such as Person, Firm, Address, Phone, Email, etc. This is a foreign key to the ENTITY_ID column in the CLEANSE_ENTITIES table.

ENTITY_INSTANCE (PK)—A number to describe an entity from the record to which the entry pertains. In some embodiments, there can be up to two addresses, two person names, six firm names, one title, six phone numbers, and six email addresses per record.

COMPONENT_ID (PK)—An identification number that refers to components of an entity as described above. This ID may be a foreign key to the COMPONENT_ID column of the LOCALIZED_CLEANSE_COMPONENTS table.

LANGUAGE (PK)—A language identifier, which allows for localization of component names.

COMPONENT_NAME—Component names such as street, person, firm, etc.

COMPONENT_ELEMENT_ID (PK)—An identification number that refers to component elements as described above. The combination of COMPONENT_ID and COMPONENT_ELEMENT_ID make up a composite foreign key to the columns by the same names in the LOCALIZED_CLEANSE_COMPONENT_ELEMENTS_table.

LANGUAGE (PK)—A language identifier, which allows for localization of component element names.

COMPONENT_ELEMENT_NAME—Component element names such as street name, street type, etc.

CHANGE_CATEGORY_ID (PK)—An identification number that refers to a change category. This is a foreign key to the CHANGE_CATEGORY_ID column in the LOCALIZED_CLEANSE_CHANGE_CATEGORIES_table.

LANGUAGE (PK)—Language code that allows for localization of categories.

CHANGE_CATEGORY_DESCRIPTION—Identifies a change category such as case, standardization, change, etc.

CHANGE_SIGNIFICANCE_ID—Identification number that refers to the significance of a change. This is a foreign key to the CHANGE_SIGNIFICANCE_ID column in the LOCALIZED_CLEANSE_CHANGE_SIGNIFICANCE_table.

LANGUAGE (PK)—Language code that allows for localization of significances.

CHANGE_SIGNIFICANCE_DESCRIPTION—Identifies whether a change is of low significance (Low), medium significance (Medium), or high significance (High).

CHANGE_REASON_ID—An identification number that refers to a change reason. This is a foreign key to the CHANGE_REASON_ID column in the LOCALIZED_CLEANSE_CHANGE_REASONS_table.

LANGUAGE (PK)—Language code that allows for localization of change reasons.

CHANGE_REASON_DESCRIPTION—Identifies a change reason as described above.

REFERENCE_DATA_MATCH_ID—Identification number that provides information on how a data element matches the reference data. This is a foreign key to the REFERENCE_DATA_MATCH_ID column in the LOCALIZED_CLEANSE_REFERENCE_DATA_MATCH_table.

LANGUAGE (PK)—Language code that allows for localization of component element names.

REFERENCE_DATA_MATCH_DESCRIPTION—Identifies whether the data element matched the reference data, or identified as the component element without matching the reference data.

INPUT_TABLE_ID (PK)—An internal ID (e.g., generated by the cleansing transforms themselves) which describes an input table to the operation.

INPUT_COLUMN_ID (PK)—The ID of the column from which the component element was parsed in the input table. In a case that the component element spans multiple columns in the input table, this table includes multiple rows for the component element.

INPUT_COLUMN_START_POSITION—The character position of the data within the column, indicating where the parsed component element begins.

INPUT_COLUMN_DATA_LENGTH—The number of characters in the parsed component element.

OUTPUT_TABLE_ID (PK)—An internal ID (e.g., generated by the cleansing transforms themselves) which describes an output table to the operation.

OUTPUT_COLUMN_ID (PK)—The ID of the column to which the component element is output the input table. In a case that the component element spans multiple columns in the output table, this table includes multiple rows for the component element.

OUTPUT_COLUMN_START_POSITION—The character position of the data within the column, indicating where the output component element begins.

OUTPUT_COLUMN_DATA_LENGTH—The number of characters in the output component element.

According to some embodiments, the change information, reference data match information, and component location information is generated independent of the generated attributes (i.e., the output fields). This information is generated whether or not there is a generated attribute selected to output the component, and is generated even if no data is output.

The change information may be generated only for the component elements which are changed. Component location information and reference data match information may be generated for all component elements encountered in the input data.

The location of each component element which is changed may be identified in both the input and the output. The column of the component element is identified by the Table_ID, Row_ID, and Column_ID. The location within the column is identified by the starting position and the length of characters.

The location is based on the exact contents of data in the input table, before any general standardization is performed. For example, if a particular input columns begin with three leading spaces before the first character of actual data, the starting position reported for that first component element is 4, and not 1 (i.e., the location if the leading spaces were trimmed before S235).

A row is written to the CLEANSE_REFERENCE_DATA_MATCH_side effect table for each component element that is parsed from the input data. The reference data match for each component element will be one of the following values:

Exact match (1)—The component element matches exactly to the reference data.

Non-exact match (2)—The component element did not match exactly to the reference data but did match within a threshold of acceptable similarity.

Identified (3)—The component element did not match the reference data, but was reliably identified based on cleansing rules.

Reference data match information will be generated for every component element identified, regardless of whether the cleansing operation made a change to the component element.

After S235, it is determined at S240 whether additional data remains to be cleansed. If so, flow returns to S205 and proceeds as described above. If not, flow terminates and the stored data may be used in some embodiments to review and filter the cleansed data as described below.

For example, user interface 1400 of FIG. 14 may be presented on any type of display apparatus (e.g., desktop monitor, smartphone display, tablet display) provided by any type of client device 130 (e.g., desktop system, smartphone, tablet computer). A client device 130 may access a data preparation application 125 of application server 120 and may present user interface 1400 provided by data preparation application 125.

User interface 1400 presents several columns of Worksheet_123. Worksheet_123 may include columns and rows not shown in FIG. 14. It will be assumed that Worksheet_123 includes cleansed data which has been generated according to process 200. Embodiments may employ any number and type of interfaces to initiate a cleansing operation, to view the cleansed data and/or to filter the cleansed data based on change reasons, significances, and/or categories.

Figure 15:
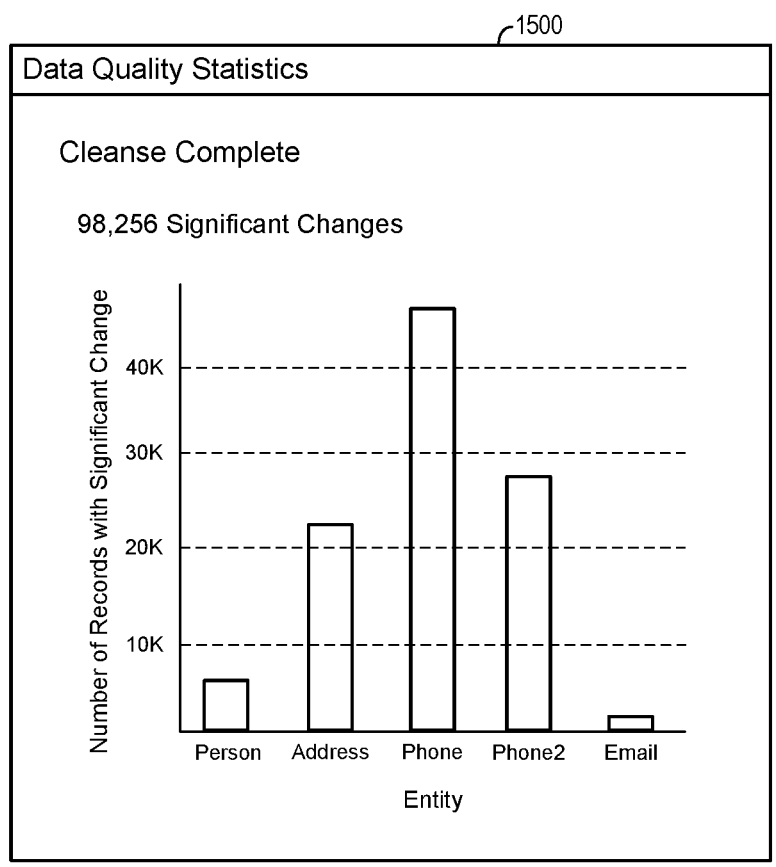
FIG. 15 is an outward view of a user interface of a Data Preparation application according to some embodiments.

FIG. 15 illustrates user interface 1500 according to some embodiments. User interface 1500 may be presented to a user after the conclusion of a cleansing operation. User interface 1500 illustrates a number of cleansed records which reflect a significant change to one or more component elements of a Person, Address, Phone, Phone2 or Email entity. Of course, a single record may include significant changes to component elements of more than one entity.

According to some embodiments, a "significant" change is any change assigned a high significance as described above. Referring to schema 1300, a query may be issued to identify records associated with CHANGE_SIGNIFICANCE_ID=1 in order to generate user interface 1500.

Figure 16:
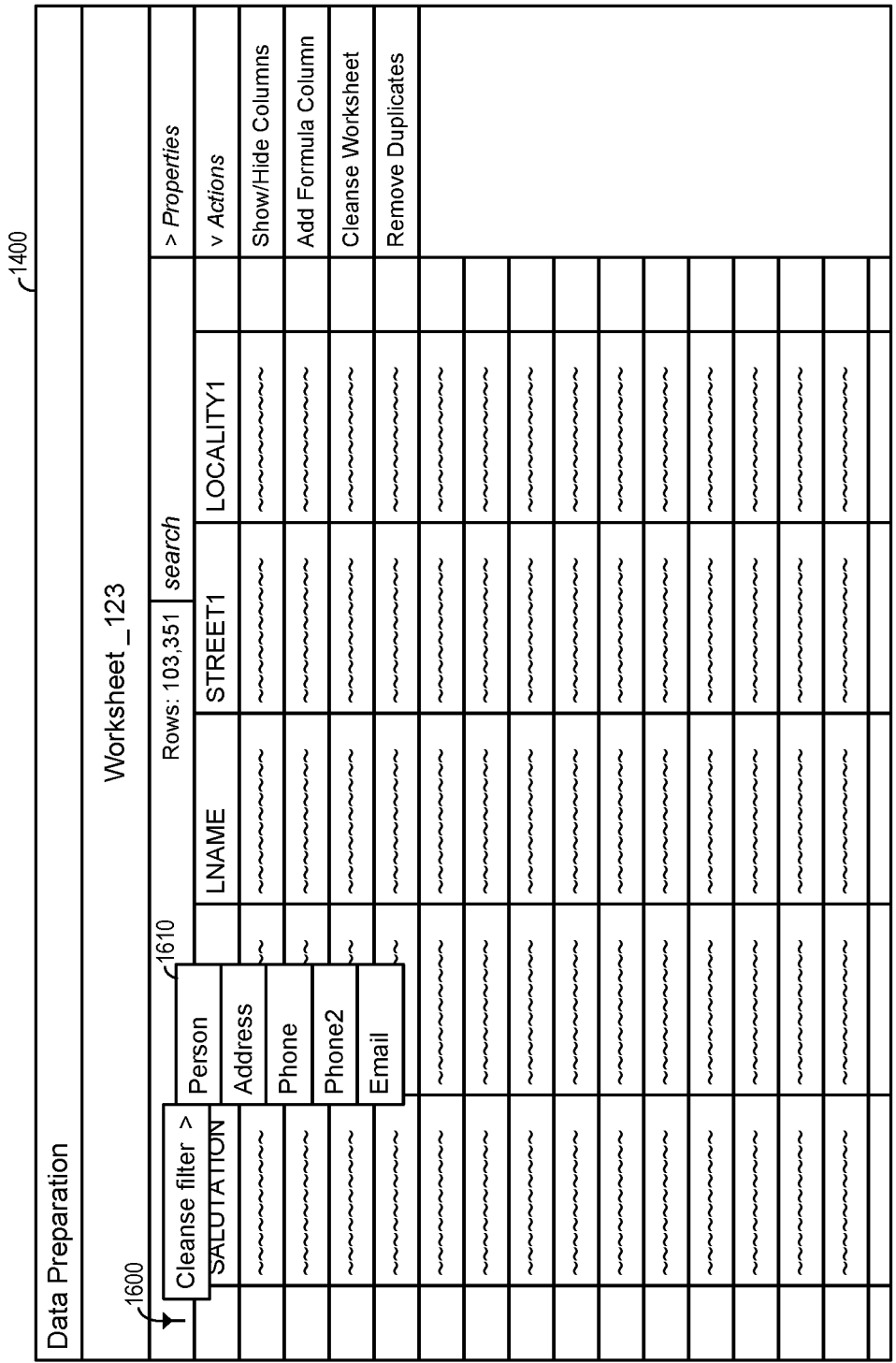
FIG. 16 is an outward view of a user interface of a Data Preparation application according to some embodiments.

FIG. 16 illustrates interface 1400 after user selection of Filter icon 1600. This selection results in display of cleanse filter menu 1610. The entities listed in menu 1610 correspond to the entities of FIG. 15. The selections offered in menu 1610 may therefore depend upon the changed component elements of Worksheet_123, their significances and their associated entities.

Figure 17:
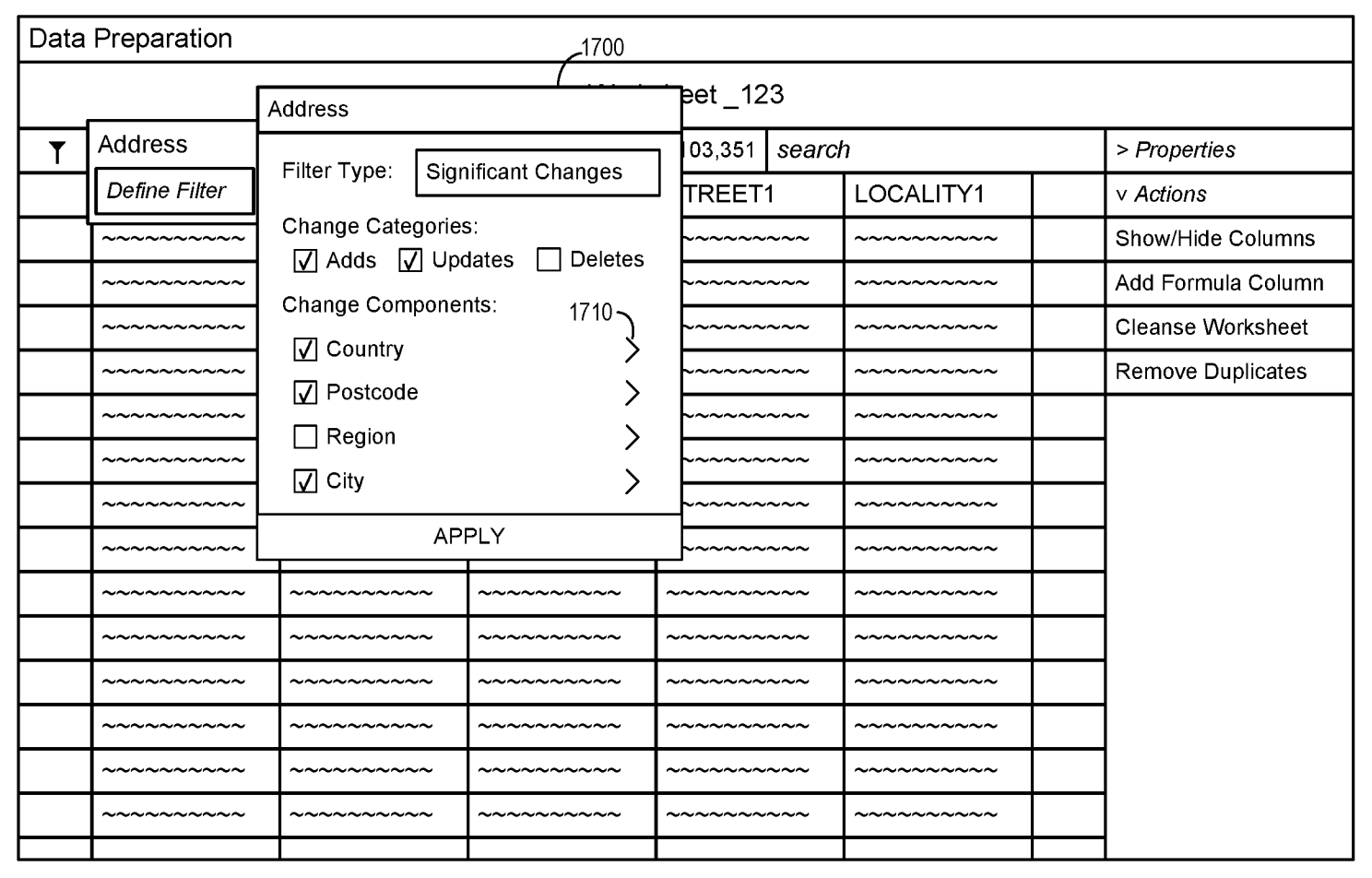

It will be assumed that the Address entity of menu 1610 is selected. FIG. 17 depicts the resulting display of Address filter menu 1700. Address filter menu 1700 allows definition of a filter type, which in the illustrated example is selected to be "Significant Changes". Other possible filter types may include "All Changes", or types which correspond to changes having a medium or low significance.

Menu 1700 also allows selection of any number of three change categories. Other change categories, including but not limited to those described above, may be selectable in menu 1700 according to some embodiments. Lastly, menu 1700 lists components of the selected Address entity. Selection of a component may filter for cleansed records including a change to an element of the component which is significant and which falls under one of the selected categories. Selection of one of icons 1710 allows filtering by component elements, as shown by menu 1800 of FIG. 18. Filtering may commence upon selection of APPLY area of menu 1800.

In this regard, interface 1400 of FIG. 19 depicts Worksheet_123 filtered so as to present only those records which include significant changes of particular categories and of particular component elements. As shown, only 252 of the original 103,531 records satisfy such criteria.

Any interface paradigm may be employed in some embodiments to view, filter or otherwise manage cleansed data based on the determined and stored reasons, significances and categories of changes reflected in the cleansed data.

Figure 20:
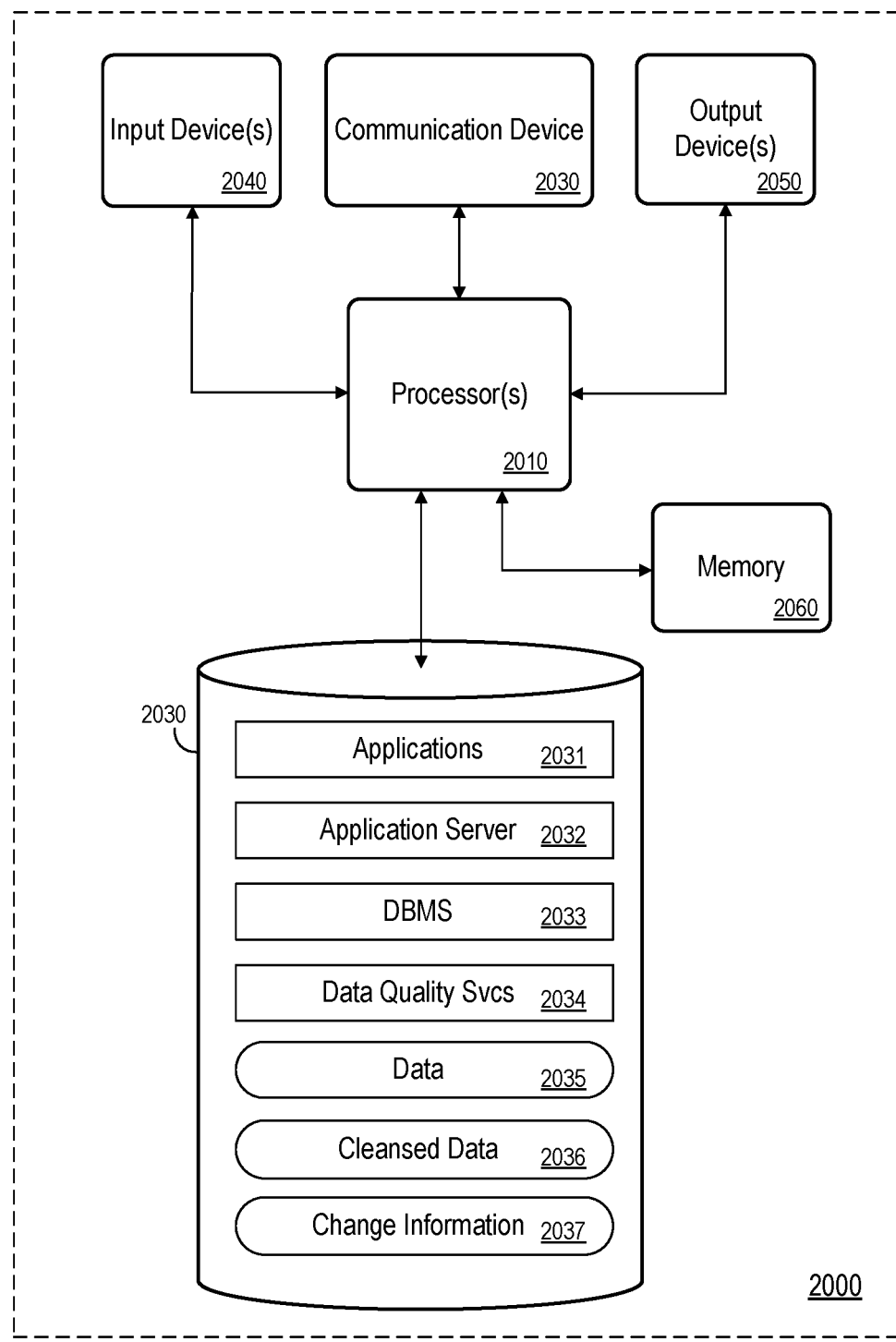
FIG. 20 is a block diagram of an apparatus according to some embodiments.

FIG. 20 is a block diagram of apparatus 2000 according to some embodiments. Apparatus 2000 may comprise a general-purpose computing apparatus and may execute program code to perform any of the functions described herein. According to some embodiments, apparatus 2000 may comprise an implementation of database 110 and application server 130 of FIG. 1. Apparatus 2000 may include other unshown elements.

Apparatus 2000 includes processor 2010 operatively coupled to communication device 2020, data storage device 2030, one or more input devices 2040, one or more output devices 2050 and memory 2060. Communication device 2020 may facilitate communication with external devices, such as a client, or an external data storage device. Input device(s) 2040 may comprise, for example, a keyboard, a keypad, a mouse or other pointing device, a microphone, knob or a switch, an infra-red (IR) port, a docking station, and/or a touch screen. Input device(s) 2040 may be used, for example, to enter information into apparatus 2000. Output device(s) 2050 may comprise, for example, a display (e.g., a display screen) a speaker, and/or a printer.

Data storage device 2030 may comprise any appropriate persistent storage device, including combinations of magnetic storage devices (e.g., magnetic tape, hard disk drives and flash memory), optical storage devices, Read Only Memory (ROM) devices, etc., while memory 2060 may comprise Random Access Memory (RAM), Storage Class Memory (SCM) or any other fast-access memory.

Applications 2031, application server 2032, DBMS 2033 and data quality services 2034 may comprise program code executed by processor 2010 to cause apparatus 2000 to perform any one or more of the processes described herein. Embodiments are not limited to execution of these processes by a single apparatus.

Data 2035 may comprise database tables storing data for one or more applications 2031, warehoused data, and/or any other data desired to be stored. Cleansed data 2036 may comprise data from data 2035 which has been subjected to one or more transforms as described above. Change information 2037 may comprise data as described herein which associates changes to component elements with a respective change category, change significance and change reason. Change information 2037 may be stored according to a schema such as schema 300 but embodiments are not limited thereto.

Data 2035, cleansed data 2036 and change information 2037 (either cached or a full database thereof) may be stored in device 2030 as shown and/or in volatile memory such as memory 2060. Data storage device 2030 may also store data and other program code for providing additional functionality and/or which are necessary for operation of apparatus 2000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    at least one server having a memory storing processor-executable process steps and a database; and
    a processor to execute the processor-executable process steps to cause the system to:
        receive a first data record comprising one or more entities, each of the one or more entities being associated with one or more component elements;
        identify one or more component elements in the first data record;
        apply a cleansing operation to change a first component element of the one or more component elements to a first cleansed component element, the first cleansed component element being different from the first component element;
        automatically determine a change significance of the change, wherein the change significance is based, at least in part, on a category associated with a type of the change and on a particular entity associated with the first component element;
        automatically determine a type of data modification associated with the change;
        store, in the database, an identifier of the first cleansed component element in association with an identifier of the change significance and an identifier of the type of data modification;
        receive a selection via a user interface of a change significance; and
        retrieve from the database and display on the user interface one or more data records having a cleansed component element associated with an identifier of a change significance corresponding to the selected change significance.

2. A system according to claim 1, wherein automatic determination of the change significance is based on the determined type of data modification.

3. A system according to claim 1, the processor to further execute the processor-executable process steps to cause the system to:
    automatically determine a change reason of the change, wherein storage of the identifier of the first cleansed component element comprises storage of the identifier of the first cleansed component element in association with an identifier of the change significance, an identifier of the type of data modification, and an identifier of the change reason.

4. A system according to claim 1, the processor to further execute the processor-executable process steps to cause the system to:
    apply a cleansing operation to change a second component element of the one or more component elements to a second cleansed component element, the second cleansed component element being different from the second component element;
    automatically determine a second change significance of the change to the second component element, wherein the second change significance is different from the first change significance; and
    store an identifier of the second cleansed component element in association with an identifier of the second change significance.

5. A system according to claim 4, the processor to further execute the processor-executable process steps to cause the system to:
    automatically determine a second type of data modification associated with the change to the second component element, wherein the second type of data modification is different from the first type of data modification,
    wherein storage of the identifier of the second cleansed component element comprises storage of the identifier of the second cleansed component element in association with an identifier of the second change significance and an identifier of the second type of data modification.

6. A computer-implemented method comprising:
    receiving a first data record comprising one or more entities, each of the one or more entities being associated with one or more component elements;
    identifying one or more component elements in the first data record;
    applying a cleansing operation to change a first component element of the one or more component elements to a first cleansed component element, the first cleansed component element being different from the first component element;
    automatically determining a change significance of the change, wherein the change significance is based, at least in part, on a category associated with a type of the change and on a particular entity associated with the first component element;
    automatically determining a type of data modification associated with the change;
    storing an identifier of the first cleansed component element in association with an identifier of the change significance and an identifier of the type of data modification;
    receiving a selection via a user interface of a change significance; and
    retrieving and displaying on the user interface one or more data records having a cleansed component element associated with an identifier of a change significance corresponding to the selected change significance.

7. A method according to claim 6, wherein the change significance is automatically determined based on the determined type of data modification.

8. A method according to claim 6, further comprising:
    automatically determining a change reason of the change, wherein storing the identifier of the first cleansed component element comprises storing the identifier of the first cleansed component element in association with an identifier of the change significance, an identifier of the type of data modification, and an identifier of the change reason.

9. A method according to claim 6, further comprising:

applying a cleansing operation to change a second component element of the one or more component elements to a second cleansed component element, the second cleansed component element being different from the second component element;

automatically determining a second change significance of the change to the second component element, wherein the second change significance is different from the first change significance; and storing an identifier of the second cleansed component element in association with an identifier of the second change significance.

10. A method according to claim 9, further comprising:

automatically determining a second type of data modification associated with the change to the second component element, wherein the second type of data modification is different from the first type of data modification, wherein storing the identifier of the second cleansed component element comprises storing the identifier of the second cleansed component element in association with an identifier of the second change significance and an identifier of the second type of data modification.

11. A non-transitory computer-readable medium storing program code, the program code executable by a computer system to cause the computer system to:

receive a first data record comprising one or more entities, each of the one or more entities being associated with one or more component elements;

identify one or more component elements in the first data record;

apply a cleansing operation to change a first component element of the one or more component elements to a first cleansed component element, the first cleansed component element being different from the first component element;

automatically determine a change significance of the change, wherein the change significance is based, at least in part, on a category associated with a type of the change and on a particular entity associated with the first component element;

automatically determine a type of data modification associated with the change;

store an identifier of the first cleansed component element in association with an identifier of the change significance and an identifier of the type of data modification;

receive a selection via a user interface of a change significance; and retrieve and display on the user interface one or more data records having a cleansed component element associated with an identifier of a change significance corresponding to the e selected change significance.

12. A medium according to claim 11, wherein automatic determination of the change significance is based on the determined type of data modification.

13. A medium according to claim 11, the program code further executable by the computer system to cause the computer system to:

automatically determine a change reason of the change, wherein storage of the identifier of the first cleansed component element comprises storage of the identifier of the first cleansed component element in association with an identifier of the change significance, an identifier of the type of data modification, and an identifier of the change reason.

14. A medium according to claim 11, the program code further executable by the computer system to cause the computer system to:

apply a cleansing operation to change a second component element of the one or more component elements to a second cleansed component element, the second cleansed component element being different from the second component element;

automatically determine a second change significance of the change to the second component element, wherein the second change significance is different from the first change significance; and store an identifier of the second cleansed component element in association with an identifier of the second change significance.

15. A medium according to claim 14, the program code further executable by the computer system to cause the computer system to:

automatically determine a second type of data modification associated with the change to the second component element, wherein the second type of data modification is different from the first type of data modification, wherein storage of the identifier of the second cleansed component element comprises storage of the identifier of the second cleansed component element in association with an identifier of the second change significance and an identifier of the second type of data modification.

* * * * *